US010035459B2

(12) United States Patent
Millot

(10) Patent No.: US 10,035,459 B2
(45) Date of Patent: Jul. 31, 2018

(54) REAR VIEW MIRROR ASSEMBLY FOR MOTOR VEHICLES

(71) Applicant: FICO MIRRORS FRANCE S.A.S., Dieuze (FR)

(72) Inventor: Daniel Louis Millot, Dieuze (FR)

(73) Assignee: FICO MIRRORS FRANCE S.A.S., Dieuze (FR)

( * ) Notice: Subject to any disclaimer, the term of this patent is extended or adjusted under 35 U.S.C. 154(b) by 0 days.

(21) Appl. No.: 14/613,865

(22) Filed: Feb. 4, 2015

(65) Prior Publication Data
US 2015/0217695 A1   Aug. 6, 2015

(30) Foreign Application Priority Data

Feb. 4, 2014 (EP) .................................... 14153829

(51) Int. Cl.
*B60R 1/078* (2006.01)
*B60R 1/074* (2006.01)
*B60R 1/076* (2006.01)

(52) U.S. Cl.
CPC .............. *B60R 1/078* (2013.01); *B60R 1/074* (2013.01); *B60R 1/076* (2013.01)

(58) Field of Classification Search
CPC ......... B60R 1/078; B60R 1/074; B60R 1/076; B60R 1/06; B60R 1/064
See application file for complete search history.

(56) References Cited

U.S. PATENT DOCUMENTS

| 5,594,590 | A | * | 1/1997 | Ishiyama | ................ B60R 1/074 359/841 |
|---|---|---|---|---|---|
| 6,793,358 | B2 | | 9/2004 | Sakata | |
| 7,125,127 | B2 | | 10/2006 | Luna | |
| 7,490,945 | B2 | | 2/2009 | Proctor | |
| 8,366,284 | B2 | | 2/2013 | Flynn et al. | |
| 8,366,285 | B2 | | 2/2013 | Reedman et al. | |
| 2004/0012867 | A1 | | 1/2004 | Sakata | |

(Continued)

FOREIGN PATENT DOCUMENTS

| EP | 0818354 | 1/1998 |
|---|---|---|
| EP | 1369301 | 12/2003 |

(Continued)

OTHER PUBLICATIONS

Extended European Search Report, Application No. 14153829.8 dated Apr. 30, 2014, 6 pages, European Patent Office, Munich, Germany.

*Primary Examiner* — Jennifer L. Doak
(74) *Attorney, Agent, or Firm* — Peter B. Scull; Hamilton, DeSanctis & Cha LLP

(57) ABSTRACT

A rear view mirror assembly having a base portion to be fixed on the motor vehicle and a movable portion attached to the base portion. Said portions can be positioned at least in an operating position and in a folded position and define an interface having teeth for raising and lowering the base portion relative to the movable portion when they are rotated. A biasing mechanism may also be provided for holding the base portion against the movable portion. Contact areas protrude from said teeth that may provide additional resistance against rotation of the movable portion to the base portion through an angle of rotation α of at least about 10° from the folded position to the operating position.

8 Claims, 5 Drawing Sheets

(56) References Cited

U.S. PATENT DOCUMENTS

| | | | |
|---|---|---|---|
| 2004/0240023 A1 | 12/2004 | Luna | |
| 2007/0035862 A1* | 2/2007 | Brouwer | B60R 1/074 359/841 |
| 2007/0165315 A1 | 7/2007 | Proctor | |
| 2009/0015955 A1* | 1/2009 | Muller | B60R 1/06 359/871 |
| 2010/0060024 A1 | 3/2010 | Flynn et al. | |
| 2010/0238570 A1 | 9/2010 | Reedman et al. | |
| 2012/0162796 A1 | 6/2012 | Van Zuijlen et al. | |
| 2013/0050857 A1* | 2/2013 | Sawada | B60R 1/074 359/841 |

FOREIGN PATENT DOCUMENTS

| | | |
|---|---|---|
| EP | 1403140 | 3/2004 |
| EP | 2159102 | 3/2010 |
| EP | 2639110 | 9/2013 |
| WO | 2005079535 | 9/2005 |
| WO | 2010151120 | 12/2010 |

\* cited by examiner

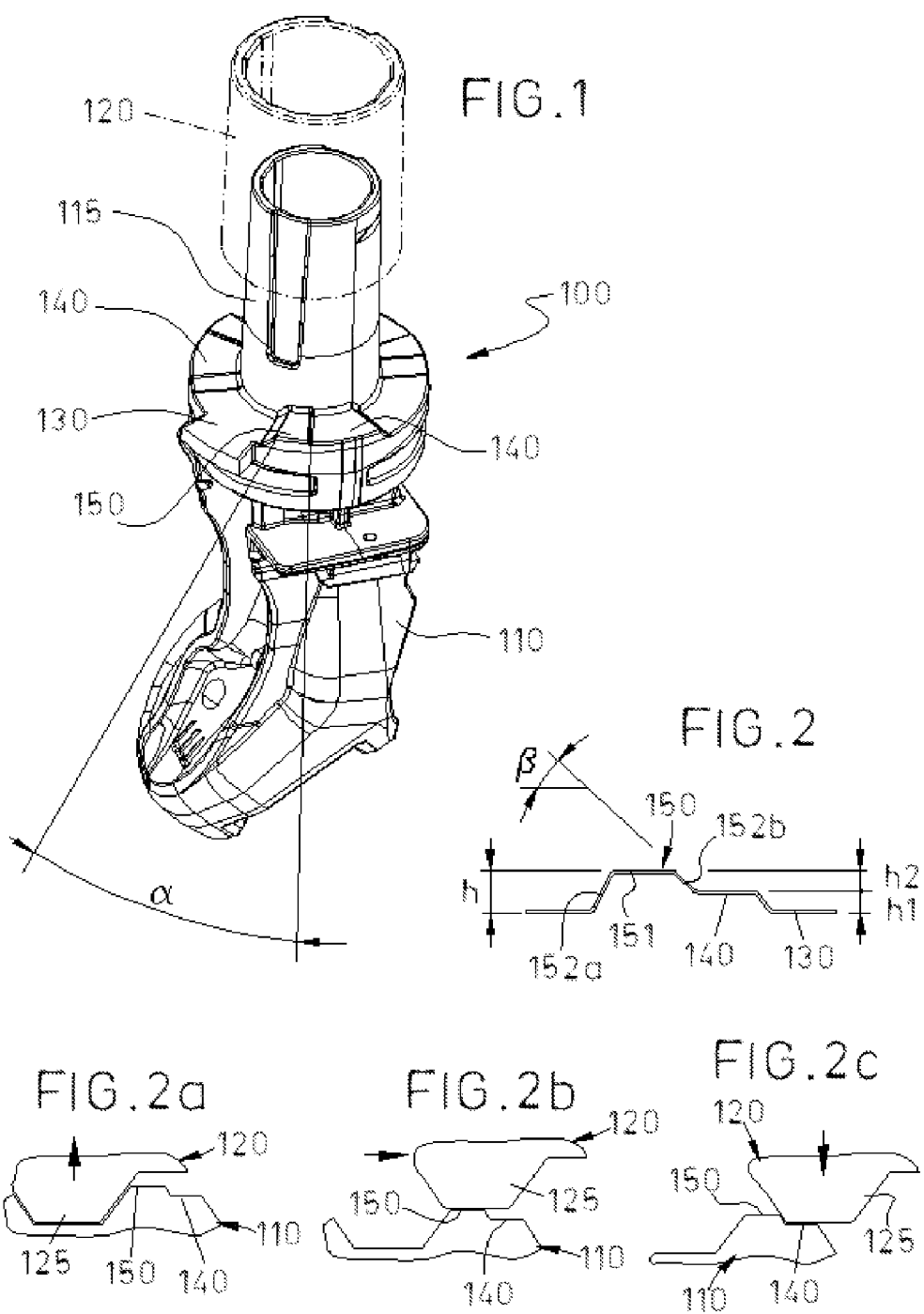

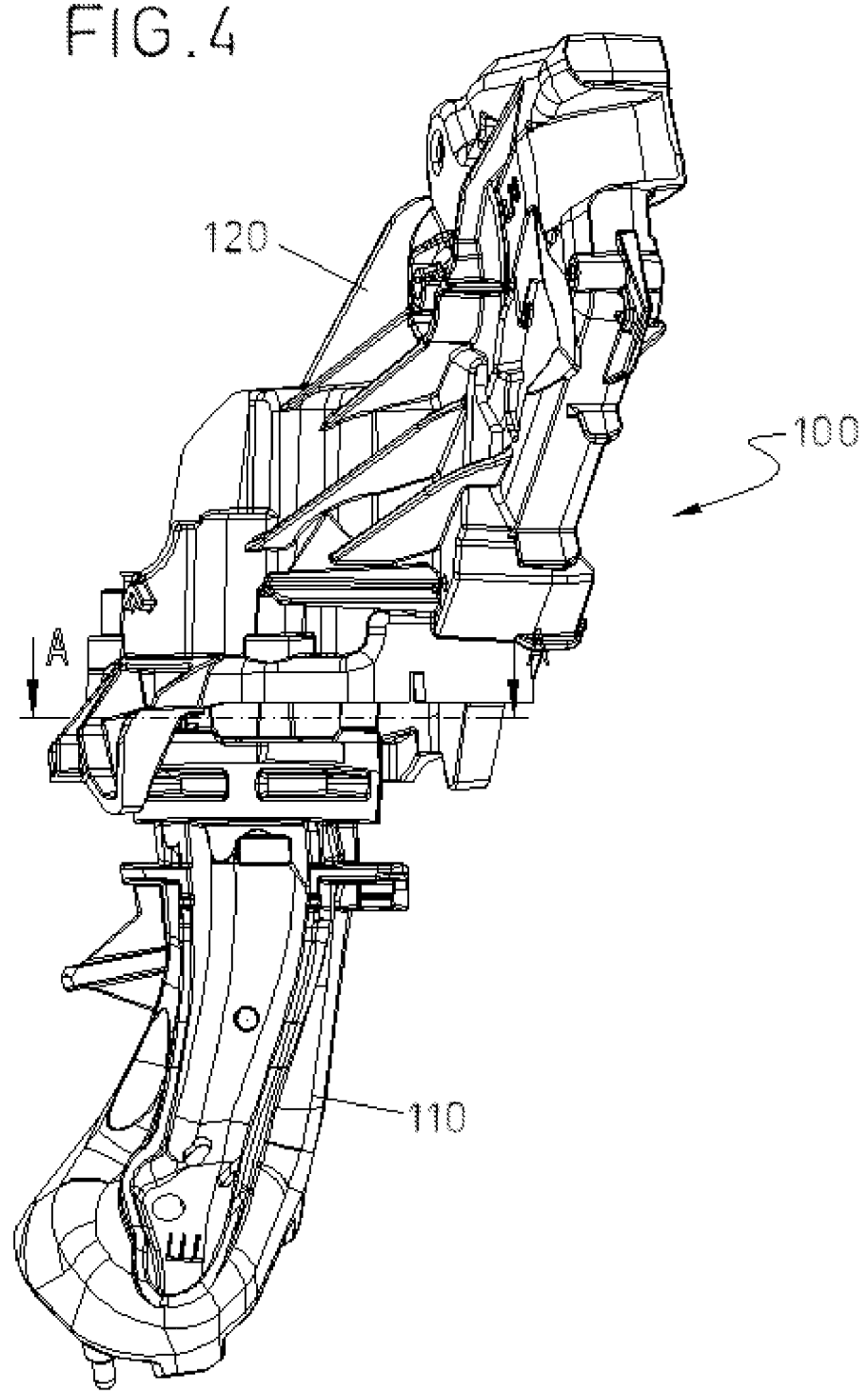

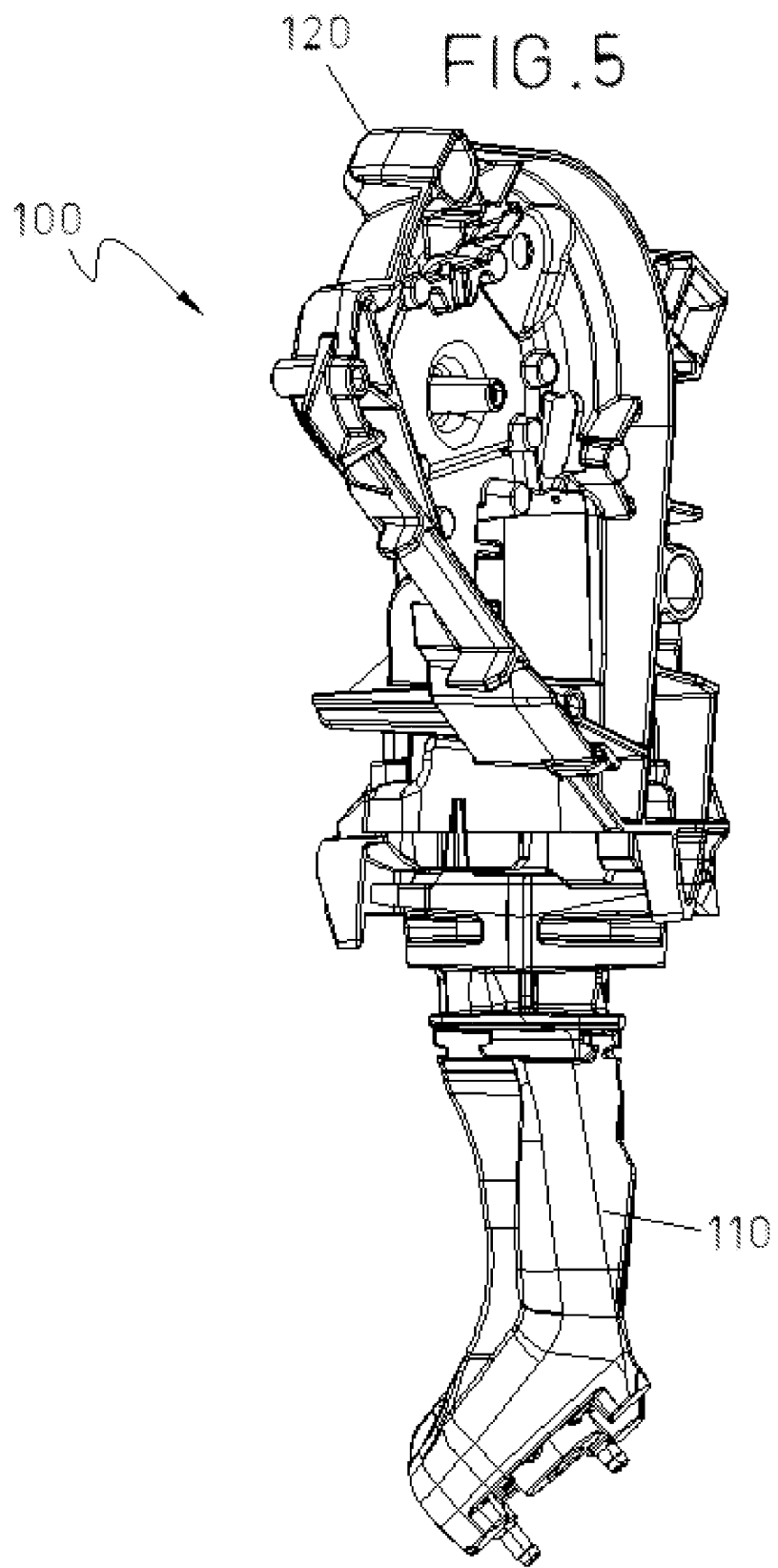

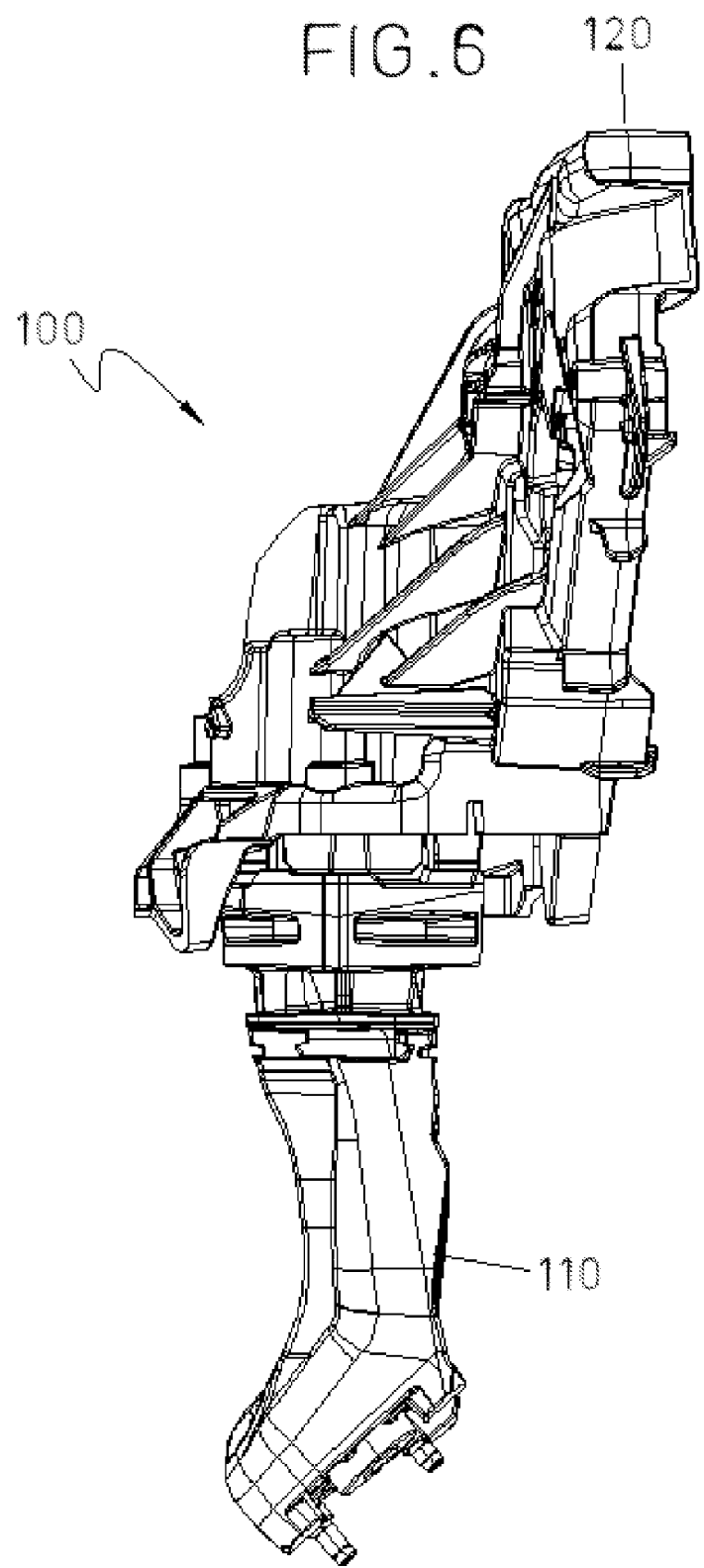

REAR VIEW MIRROR ASSEMBLY FOR MOTOR VEHICLES

The present disclosure relates to rear view mirror assemblies for motor vehicles. It specifically refers both to power fold rear view mirror assemblies and manually foldable rear view mirror assemblies for motor vehicles.

BACKGROUND

Both in power fold and manually foldable rear view mirror assemblies there are situations where the user folds the rear view mirror manually from a folded parking position to an operating driving position, and vice versa.

In the folded parking position the rear view mirror is not to be used, for example when the vehicle is parked or when it is being washed. In this position, the rear view mirror is arranged substantially along the vehicle.

In the operating driving position, the rear view mirror is to be used, for example when the vehicle is driven. In this position, the rear view mirror is arranged substantially transversely to the vehicle and projects therefrom.

When the rear view mirror of the vehicle is in said folded parking position, it is usually desired that the rear view mirror remains in said position, for example locked, and does not become unfolded to the operating driving position.

Although in many cases this can be avoided in power fold rear view mirror assemblies through the torque that is provided by the electrical actuator itself to allow a stable position where the rear view mirror assembly is held in the folded parking position, in manually operated rear view mirror assemblies this can not be easily ensured.

Documents WO2005079535 and EP1403140, for example, disclose rear view mirror assemblies for motor vehicles including a plurality of detent elements. In both cases, the detent elements only provide a single stable position when the rear view mirror is in the operating driving position.

There is thus still the need for a rear view mirror assembly that is capable of ensuring that the rear view mirror is held in a folded parking position unless the user really desires to arrange the rear view mirror in the operating driving position.

SUMMARY

A rear view mirror assembly for motor vehicles is provided comprising a base portion intended to be fixed on the motor vehicle, such as a part of the car body, and a movable portion or mirror head to be attached to the base portion. The movable portion is movable relative to the base portion such that it can be positioned at least in an operating driving position and in a folded parking position.

In the operating driving position, the rear view mirror can be used, for example when the vehicle is driven, with the rear view mirror being positioned substantially transversely to the vehicle. In the folded parking position, the rear view mirror is positioned for being used, for example when the vehicle is parked or being washed, with the rear view mirror being positioned substantially along the vehicle.

A common interface is defined by the base portion and the movable portion. This common interface is a surface defined between said portions and in use it is at least partially contacted by the base portion and the movable portion such that as said portions are moved to each other they slide at least partially along the common interface.

The common interface comprises a number of teeth. The teeth have a suitable height for raising and lowering the movable portion relative to the base portion when the former is rotated to the latter. Said teeth are shaped for providing a first amount of resistance against the relative rotation of the movable portion and the base portion.

The present rear view mirror assembly further includes a biasing mechanism for holding the base portion against the movable portion. In a particular embodiment, the biasing mechanism comprises a compression spring. Such compression spring may be designed to exert a force of about 800N for holding the base portion against the movable portion.

A series of contact areas are provided protruding from the teeth of the interface. The contact areas may be formed in the base portion protruding towards the movable portion or they may be formed in the movable portion protruding towards the base portion, or even both in the base portion and in the movable portion protruding towards each other.

The contact areas comprise a flat portion extending into corresponding end ramp portions. One end ramp portion extends directly to the surface of the interface while the other, opposite ramp portion extends to the upper surface of one tooth of the interface.

Such end ramp portions may be at an angle of about 45° to the flat portion of the contact areas. In some embodiments, the contact areas may be arranged protruding about 0.5 mm from the teeth of the interface. This thus involves an increased height for said teeth and consequently an additional amount of resistance is provided against rotation of the movable portion to the base portion. Such additional amount of resistance is provided through an angle of rotation of at least about 10° from the folded parking position to the operating driving position.

With the described configuration for the interface between the movable and the base portions, together with the above biasing mechanism, a retention force of about 30N may be provided against rotation of the movable portion to the base portion. Advantageously, such retention force is enough to ensure that the movable portion of the rear view mirror does not become unfolded when in the folded parking position.

This retention force provided by the contact areas formed in the teeth of the interface themselves ensures that the mirror device is held in the folded parking position in normal conditions. This is advantageous in many situations, for example, when the vehicle is parked or when it is being washed.

A further advantage of the above construction is that a retention device defined by small contact areas covering about 10° take up very little space. This results in that this configuration may be provided within a standard mirror device. Therefore, with the present rear view mirror assembly, having a small space inside the rear view mirror assembly is no longer a problem.

Still a further advantage of the present rear view mirror assembly is that an additional mechanism and method for a stable position in parking position is thus provided.

The additional amount of resistance through an angle of rotation of at least about 10° from the folded parking position to the operating driving position may be carried out by providing the movable portion such that it can be rotated to the base portion by at least about 70° between the operating driving position to the folded parking position. Through such value of travel of the mirror movable portion involving a wider range of the mirror angle of orientation, a good stable position for the mirror folded parking position may be provided.

Additional objects, advantages and features of embodiments of the present rear view mirror assemblies will become apparent to those skilled in the art upon examination of the description, or may be learned by practice thereof.

BRIEF DESCRIPTION OF THE DRAWINGS

Particular embodiments of the present rear view mirror assemblies will be described in the following by way of non-limiting examples, with reference to the appended drawings, in which:

FIG. 1 is a perspective general fragmentary view of one embodiment of the present rear view mirror assemblies showing the base portion and where the movable portion has been depicted schematically;

FIG. 2 is a diagrammatic view of a portion of the common interface;

FIG. 2a, 2b, 2c are diagrammatic fragmentary views of a present rear view mirror assembly showing the movable portion from the driving position shown in FIG. 2a to the parking position shown in FIG. 2c, passing through an intermediate position, shown in FIG. 2b;

FIG. 4 is an elevational view of a present rear view mirror assembly shown with the movable portion situated in an operating driving position;

FIG. 5 is an elevational view of a rear view mirror assembly shown with the movable portion situated in an intermediate position; and FIG. 6 is an elevational view of a rear view mirror assembly shown with the movable portion situated in a folded parking position.

DETAILED DESCRIPTION

Figure 3:
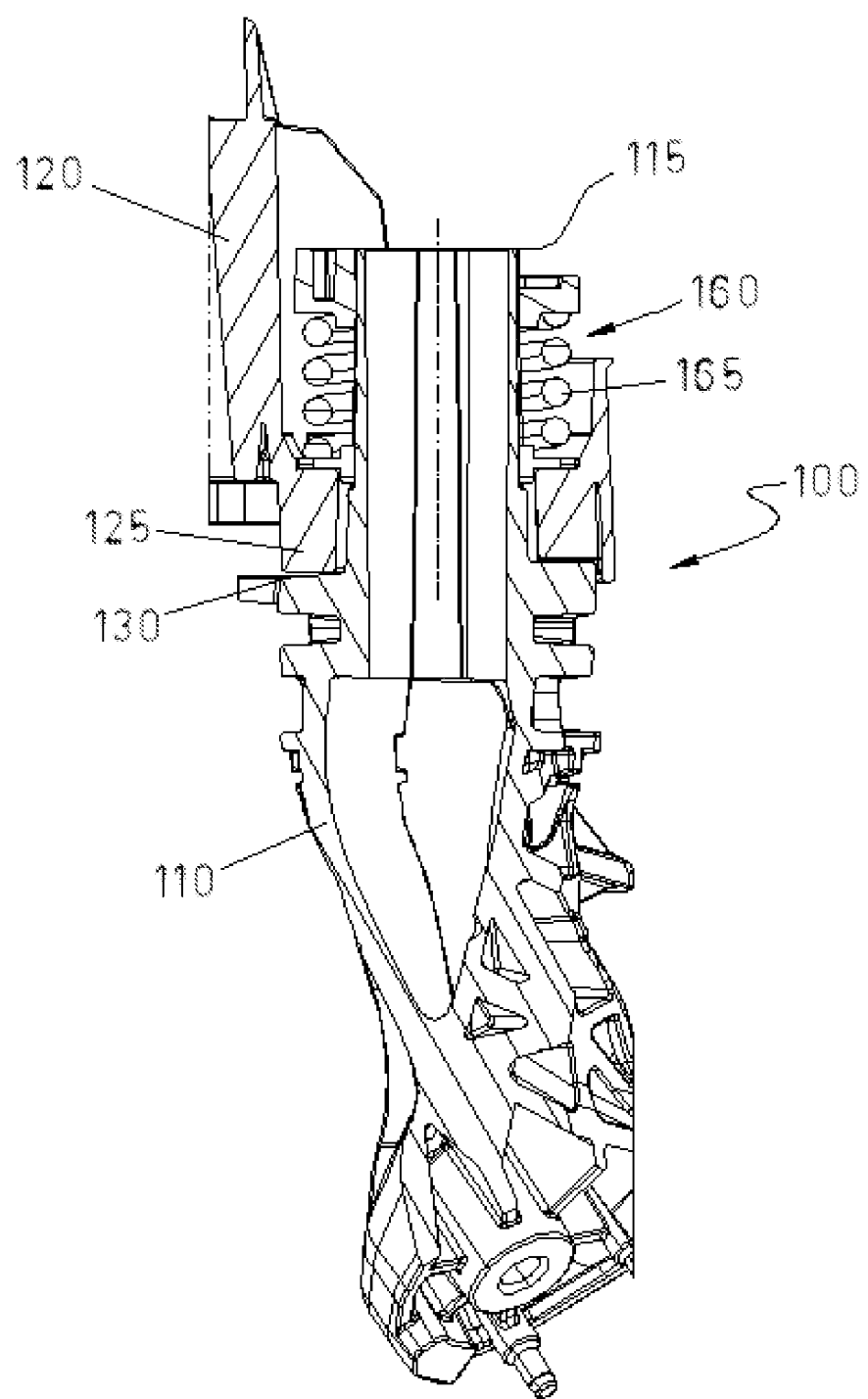
FIG. 3 is a cross-sectional fragmentary view of an embodiment of the present rear view mirror assembly where a spring is shown.

According to the embodiment shown in the FIGS. 1-6 by way of an example, the present rear view mirror assemblies for motor vehicles designated as a whole by reference numeral 100 comprise a base portion 110 and a movable portion 120, or mirror head.

The base portion 110 is arranged fixed on a part of a car body (not shown). The movable portion 120 is attached to the base portion 110 and can be moved relative thereto. Specifically, the movable portion 120 can be rotated and displaced upwards and downwards relative to the base portion 110.

Rotation of the movable portion 120 relative to the base portion 110 allows the mirror to be positioned at least in two positions relative to the car body: an operating driving position as shown in FIG. 4, in which the rear view mirror assembly 100 is ready to be used, for example when the vehicle is driven, where the rear view mirror 100 is substantially transverse to the vehicle; and a folded parking position as shown in FIG. 6, in which the rear view mirror 100 is not used, for example when the vehicle is parked or being washed, where the rear view mirror 100 is positioned substantially along the vehicle.

The base portion 110 and the movable portion 120 of the present rear view mirror 100 define a common interface 130. The common interface 130 is schematically shown in FIG. 2. According to FIG. 2, the common interface 130 is formed in the base portion 110 and, in use, it is at least partially contacted by the movable portion 120. As the movable portion 120 is rotated to the base portion 110, the former slides along the latter on the common interface 130.

The common interface 130 comprises a number of teeth 140. One of such teeth 140 is schematically shown in FIG. 2. The teeth 140 project from the common interface 130 a determined first height h1, which may be of the order of about 2.2 mm. Such teeth 140 cause the movable portion 120 to be raised or lowered as it is rotated to the base portion 110 providing a first amount of resistance against rotation.

As shown in said FIG. 2, the common interface 130 may further include one or a series of contact areas 150. The contact areas 150 are provided protruding from the above mentioned teeth 140 of the interface 130 a determined second height h2, which may be of the order of about 0.5 mm from said teeth 140. Therefore, as depicted in FIG. 2, there is a total height h of about 2.7 mm that provides an additional amount of resistance against rotation of the movable portion 120 to the base portion 110. This additional amount of resistance against rotation is provided through an angle of rotation $\alpha$ of at least about 10°, as depicted in FIG. 1, from the folded parking position (FIG. 6) to the operating driving position (FIG. 4).

A biasing mechanism 160 is also provided as shown in FIG. 3. In the embodiment shown in said FIG. 3, they may include a compression spring 165 arranged around an upper stem 115 of the base portion 110. Compression spring 165 is designed to exert a force of about 800N to maintain the base portion 110 attached to the movable portion 120. The movable portion 120 is thus displaced upwards and downwards relative to the base portion 110 against the force of said compression spring 165 as the movable portion 120 is rotated sliding on the above mentioned teeth 140 of the interface 130.

As shown in the figures, the contact areas 150 are formed in the base portion 110 protruding upwards to the movable portion 120. As shown in FIG. 2 of the drawings, the contact areas 150 comprise an upper flat portion 151, which defines a stable sliding of teeth 125 formed in the movable portion 120 extending downwards therefrom. The upper flat portion 151 of the contact areas 150 extends into corresponding end ramp portions 152a, 152b. As shown in FIG. 2, one of the end ramp portions 152a extends directly to the surface of the interface 130. The other of the end ramp portions 152b extends to the upper surface of the tooth 140 of said interface 130.

From a first locked position in the driving position shown in FIG. 2a, the movable portion 120 is rotated to the base portion 110 causing the teeth 125 of the movable portion 120 to slide on the end ramp portion 152a (shown in FIG. 2) of the contact areas 150 so that the movable portion 120 is moved upwards to the base portion 110 as shown by an arrow in FIG. 2a to the position shown in FIG. 2b. The amount of upward movement of the movable portion 120 corresponds to the above mentioned height h of about 2.7 mm corresponding to the distance from the interface 130 to the upper flat portion 151 of the contact area 150. Then the teeth 125 of the movable portion 120 slide on said upper flat portion 151 of the contact areas 150 as shown in FIG. 2b. Then the teeth 125 of the movable portion 120 slide on the end ramp portion 152b (shown in FIG. 2) of the contact areas 150 so that the movable portion 120 is moved downwards to rest on the upper surface of the teeth 140 of the interface 130. The movable portion 120 becomes thus locked to the base portion 110 in the folded parking position shown in FIG. 2c. The amount of downward movement of the movable portion 120 in this movement corresponds to the above mentioned second height h2, of about 0.5 mm corresponding to the distance from the upper flat portion 151 of the contact area 150 the upper surface of the tooth 140. In this final position, the movable portion 120 is in a second locked position corresponding to the folded parking position.

From this second locked position shown in FIG. 2c, when the user desires to arrange the mirror assembly 100 back to the operating driving position shown in FIG. 2a, the movable portion 120, that is, the mirror head, is rotated to the base portion 110 in the opposite direction causing the teeth 125 of the movable portion 120 to slide on the end ramp portion 152b (shown in FIG. 2) of the contact areas 150. This causes the movable portion 120 to be moved upwards against the above mentioned additional amount of resistance of about 30N. Then the teeth 125 of the movable portion 120 slide on the upper flat portion 151 of the contact areas 150 as shown in FIG. 2b. Then, the teeth 125 of the movable portion 120 slide on the end ramp portion 152a (shown in FIG. 2) of the contact areas 150 so that the movable portion 120 is moved downwards to the base portion 110 to be again in said first locked position shown in FIG. 2a, which, as described, corresponds to the operating driving position.

As it can be seen in said FIG. 2, the end ramp portions 152a, 152b are arranged at an angle β of about 45° to the upper flat portion 151 of the contact areas 150. This particular geometry, in combination with the compression spring 165 provides a retention force of about 30N against rotation of the movable portion 120 to the base portion 110 which has been found that is suitable to keep the movable portion 120 locked to the base portion 110 when the mirror assembly 100 is not to be used.

The invention claimed is:

1. A rear view mirror assembly for motor vehicles, the assembly comprising:
   a base portion configured to be fixed on a motor vehicle;
   a movable portion movable relative to the base portion such that it can be positioned at least in an operating driving position and in a folded parking position;
   a common interface defined by the base portion and the movable portion, said common interface comprising a number of teeth for raising and lowering the movable portion relative to the base portion when rotated providing a first amount of resistance; and
   a biasing mechanism for holding the base portion against the movable portion;
   wherein a series of contact areas are provided protruding from the teeth of the common interface such that an additional amount of resistance is provided against rotation of the movable portion to the base portion through an angle of rotation α of at least about 10° from the folded parking position to the operating driving position,
   wherein a first height h1 is defined corresponding to the distance the teeth protrude from the common interface; and second height h2 is defined corresponding to the distance the contact areas protrude from the teeth of the common interface, such that an additional amount of resistance against rotation of the movable portion to the base portion is provided from the folded parking position to the operating driving position;
   each of the contact areas having an upper flat portion extending into corresponding end ramp portions, one of the end ramp portions extending directly to the surface of the interface and the other of the end ramp portions extending to the upper surface of the tooth of the common interface;
   wherein from a first locked position in said driving position, the movable portion is rotated to the base portion causing the teeth of the movable portion to slide on the end ramp portion of the contact areas so that the movable portion is moved upwards to the base portion a height h corresponding to the distance from the common interface to the upper flat portion of the contact area, then the teeth of the movable portion slide on said upper flat portion of the contact areas, then the teeth of the movable portion slide downwards the second height h2, lower than said height h, on the end ramp portion of the contact areas to rest on the upper surface of the teeth of the common interface, locking the movable portion to the base portion in the folded parking position.

2. The assembly as in claim 1, wherein the contact areas are formed in the base portion protruding towards the movable portion.

3. The assembly as in claim 1, wherein the contact areas are formed in the movable portion protruding towards the base portion.

4. The assembly as in claim 1, wherein at least one of the end ramp portions is formed at an angle β of about 45° to the flat portion of the contact areas.

5. The assembly as in claim 1, wherein the contact areas are arranged protruding a distance h2 of about 0.5 mm from the teeth of the common interface.

6. The assembly as in claim 1, wherein the biasing mechanism is configured to exert a force of about 800N for holding the base portion against the movable portion.

7. The assembly as in claim 1, wherein the contact areas are arranged such that a retention force of about 30N is provided against rotation of the movable portion to the base portion.

8. The assembly as in claim 1, wherein the biasing mechanism comprises a compression spring for holding the base portion against the movable portion.

* * * * *